United States Patent [19]
Gulotta et al.

[11] 3,940,256
[45] Feb. 24, 1976

[54] APPARATUS AND METHOD FOR CONTROLLING THE FLATNESS OF A NEWLY-FORMED CONTINUOUS SHEET OF FLAT GLASS

[75] Inventors: Joseph A. Gulotta, New Kensington; Leonard A. Knavish, Plum Borough; John E. Sensi, Arnold, all of Pa.

[73] Assignee: PPG Industries, Inc., Pittsburgh, Pa.

[22] Filed: Oct. 15, 1974

[21] Appl. No.: 514,977

[52] U.S. Cl............... 65/65 A; 65/99 A; 65/182 R; 65/203; 65/204
[51] Int. Cl.² ....................................... C03B 18/02
[58] Field of Search...... 65/65 A, 99 A, 162, 182 R, 65/204, 203

[56] References Cited
UNITED STATES PATENTS

| | | | |
|---|---|---|---|
| 3,223,502 | 12/1965 | Ward et al. | 65/204 X |
| 3,649,237 | 3/1972 | Classen et al. | 65/162 |
| 3,674,456 | 7/1972 | Swillinger | 65/99 A X |

*Primary Examiner*—Arthur D. Kellogg
*Attorney, Agent, or Firm*—E. Kears Pollock

[57] ABSTRACT

Flat glass is produced by advancing a layer of molten glass on the surface of molten metal while cooling it sufficiently to form a continuous sheet of glass which is lifted upwardly from the surface of the supporting pool of molten metal and conveyed upwardly from it for further processing. A method is provided for selectively controlling the temperature, and thus the viscosity, of the glass of selected portions across the width of the continuous sheet of glass in order to adjust and maintain the relative lengths of the respective portions of the continuous sheet of glass as it is lifted upwardly from the supporting pool of molten metal and to thereby control the flatness of the continuous sheet of glass as it is ascending from the supporting pool of molten metal.

13 Claims, 9 Drawing Figures

APPARATUS AND METHOD FOR CONTROLLING THE FLATNESS OF A NEWLY-FORMED CONTINUOUS SHEET OF FLAT GLASS

CROSS REFERENCE TO RELATED APPLICATIONS

This application is related to application Ser. No. 483,508 entitled, "Manufacture of Glass," filed June 27, 1974, by Gerald E. Kunkle and assigned to the present assignee.

BACKGROUND OF THE INVENTION

1. Field of the Invention

This invention relates to the method for the manufacture of a continuous sheet of flat glass by supporting molten glass on a pool of molten metal while cooling and forming the glass. More particularly, this invention relates to a method for selectively controlling the temperature of the glass while the glass is supported for forming prior to removal from the supporting pool of molten metal to minimize relative differential flow of glass within the advancing glass.

2. Description of the Prior Art

Molten glass may be delivered onto molten metal and formed into a continuous sheet or ribbon of flat glass according to the teachings of Heal, U.S. Pat. No. 710,357 or Hitchcock, U.S. Pat. No. 789,911; or according to the teachings of Pilkington, U.S. Pat. Nos. 3,083,551 and 3,220,816; or according to the teachings of Edge and Kunkle, application Ser. No. 338,497 filed Mar. 6, 1973 now U.S. Pat. No. 3,843,346. These patents describe processes in which continuous sheets of flat glass are formed while the glass being formed is supported on molten metal. These patents are primarily concerned with different methods for delivering molten glass to the surface of a pool of molten metal and different methods of treating the glass while supported thereon. After a continuous sheet of glass has been formed, it has been shown to be removed from the surface of a pool of supporting molten metal by lifting it slightly and conveying it away from the pool of molten metal. It has also been shown in U.S. Pat. No. 3,233,995 to Javaux and U.S. Pat. No. 3,420,647 to Charnock that molten glass delivered onto the supporting surface of a pool of molten metal may be cooled insufficiently to form a continuous sheet of glass having fixed dimensions and then the unfinished layer of glass is drawn upwardly from the surface of a pool of molten metal to form a continuous sheet of glass having stable dimensions. The layer of glass is cooled and formed during such upward drawing, with such drawing being in the nature of sheet glass drawing as known per se in the Pittsburgh, Colburn or Fourcault process.

In the cross-referenced, related application already referred to, Kunkle describes a process wherein a layer of molten glass is delivered onto a surface of a pool of molten metal and is advanced thereon and cooled to form a dimensionally stable, continuous sheet of glass having a fixed width and thickness, and this completely formed sheet of glass is then lifted upwardly from the surface of the pool of molten metal and conveyed upwardly, preferably vertically, from the pool of molten metal. As the ascending sheet of glass is conveyed upwardly, it is engaged above the surface of the pool of molten metal by traction-applying means such as the rolls of a conveyor. It is desirable that stresses within the glass be avoided in the method of Kunkle as it is a method having the purpose of minimizing thermally-induced stresses within the glass during its horizontal advance, during its lifting and during its upward conveyance into and through the upward conveying apparatus provided. The present invention is concerned with means for alleviating and preventing the development of stresses within the glass due to misalignment or disorientation of the sheet of glass caused by uneven mechanical forces acting upon the sheet of glass as it enters a conveying mechanism. This invention provides for preventing substantial disorientation of a sheet of glass ascending upwardly from a pool of molten metal and entering the lowermost traction-applying engaging elements of a conveying apparatus.

SUMMARY OF THE INVENTION

A continuous sheet of flat glass is produced by a method including the following steps: A layer of molten glass is delivered onto the surface of a pool of molten metal maintained within a forming chamber. The molten metal is preferably tin, an alloy of tin or some other metal having a specific gravity greater than the glass and having a melting point lower than the glass to be formed while being substantially nonreactive to the glass and its melting temperature. The layer of molten glass is advanced along the surface of the pool of molten metal and is cooled during such advance to form a dimensionally stable, continuous sheet of glass.

Forces are applied to the glass while it is advanced along the surface of the pool of molten metal. Forces may be applied to the glass which are aligned substantially along its path to cause it to be advanced and may cause it to be attenuated to a thickness that is less than an equilibrium thickness during its advance. These forces are characterized as longitudinal tractive forces and may be applied to any location along the length of the glass sheet. They are preferably applied to the glass at locations well along its path of advance and are transferred to the hot or more fluid glass primarily by the surface tension of the glass. Other forces may be applied to the glass in the manner such that they are aligned substantially across or transverse to its path of advance, and these are characterized and transverse forces. The resultant forces, caused by the application of the described forces in combination with the reactive surface tension and gravity forces acting on the glass, cause it to be formed into a continuous, flat sheet of desired thickness.

After the glass has been cooled sufficiently to become dimensionally stable (that is, if it has reached its final width and thickness), it is advanced farther along the surface of molten metal and then is lifted from the surface of the pool of molten metal and conveyed from the forming chamber. The continuous sheet of glass is lifted and conveyed upwardly from the pool of molten metal in the manner described by Gerald E. Kunkle in his copending, commonly assigned patent application, the description of which is incorporated by reference herein.

The glass is cooled sufficiently prior to lifting it from the surface of the pool of molten metal so that its width and thickness remain unchanged during lifting and conveyance from the forming chamber. It is most desirable to adjust or control the temperature of the glass so that its viscosity will be within the range from about $10^{7.5}$ to $10^{12.5}$ poises at the time of lifting. It is further desirable to adjust and maintain the temperature of the glass during its upward conveyance so that the temperature will be decreased sufficiently to cause the viscosity to be greater than about $10^{13}$ poises while maintaining the glass in flat, planar alignment.

The continuous sheet of glass is permitted to freely form a curved, lifting region having a radius indicated by the temperature and viscosity of the glass. As the glass is advanced along the surface of the molten metal pool and immediately before the glass is lifted from the supporting pool of molten metal, selected portions of the glass are separately and individually conditioned to control the temperature of the glass at those locations. In this way the viscosity of the advancing continuous sheet of glass is controlled to be substantially uniform across the width of the sheet and to everywhere across the width be greater than a viscosity permitting observable flow of the glass within the sheet. The selected portions of the continuous sheet of glass are preferably conditioned by exposure to separate controllable heaters and coolers extending into the forming chamber over the selected portions of the continuous sheet of glass. The selected portions of the glass each comprise no more than about one-fifth of its width and preferably no more than about one-tenth of its width. Even if the portions are unequal in width a minimum of five portions are preferred.

This invention will be further understood with reference to the drawings accompanying this description.

DESCRIPTION OF THE PREFERRED EMBODIMENTS

Figure 1:
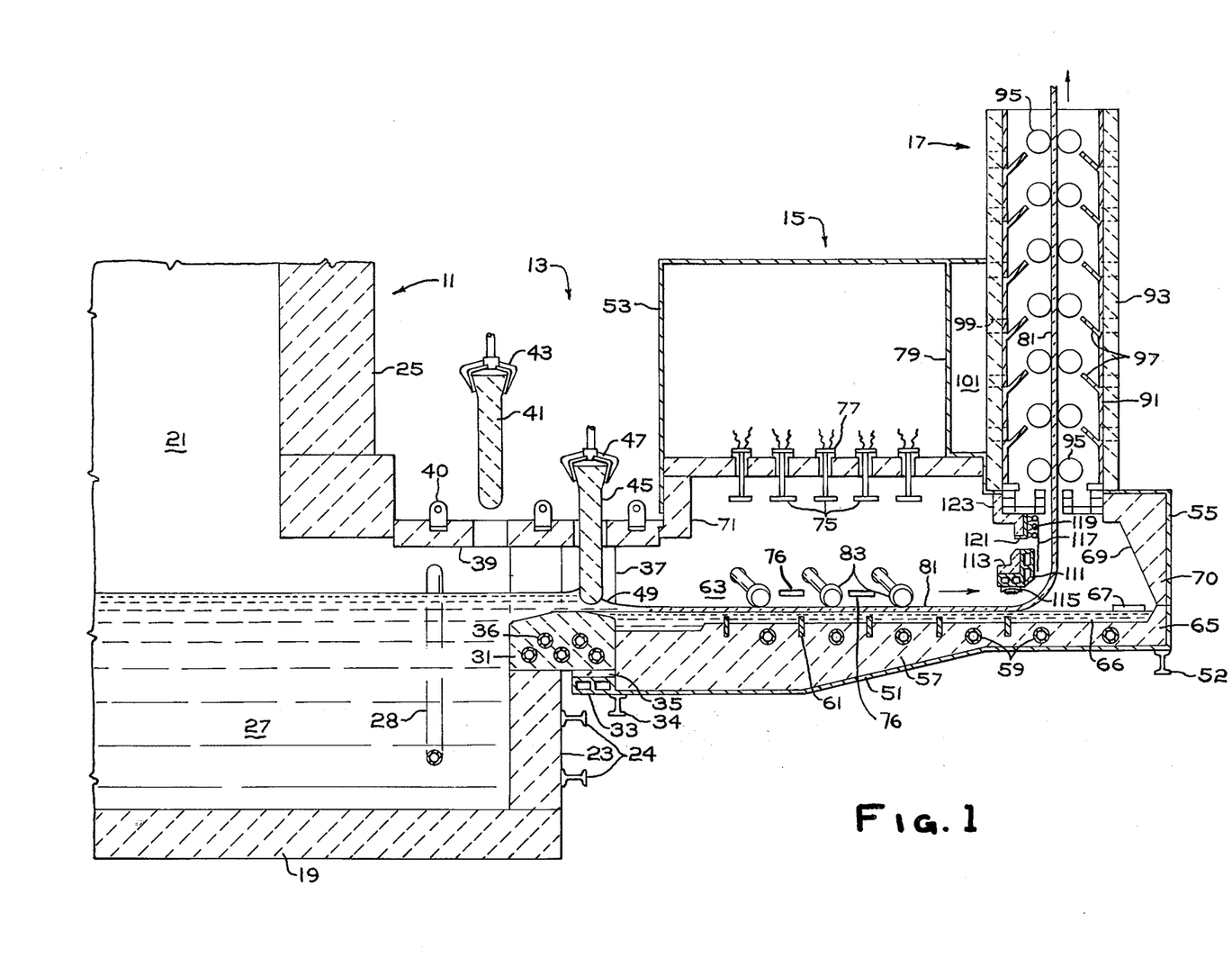
FIG. 1 is a sectional elevation view of an apparatus for producing flat glass in accordance with this invention.

Referring now to FIG. 1 there is shown a view of a suitable apparatus for carrying out the present invention. The glassmaking apparatus comprises a furnace 11, delivery means 13 and a forming chamber 15 and a vertical conveyor 17 which may be, and preferably is, included in an annealing lehr. It will be understood that the lifting and conveying apparatus employed in the practice of this invention may cause the glass to be conveyed along an upwardly extending path that need not be vertical as shown in FIG. 1, but rather may be sloped upwardly.

The glassmaking furnace 11 includes a melting section (not shown) and a refiner or conditioner, the end of which is shown. The refiner or conditioner section of the furnace 11 comprises a furnace bottom 19, side walls 21 and a front basin wall 23. The basin wall 23 is maintained in position by structural members 24. The furnace further comprises an upper front wall 25 which is preferably suspended or supported from above and a roof overlying the upper portion of the furnace, the roof not being shown.

The delivery means 13 includes a threshold 31 resting on a cooling block 33 or other support, which is supported by structural member 34. A cast refractory seal 35 or the like is disposed between the threshold 31 and the cooling block 33. Extendig through the holes in the threshold are conduits or pipes 36 for transporting coolant or the like through the interior of the threshold 31 and for controlling its temperature during use. At the ends of the threshold 31 there are side wall portions or jambs 37 on the sides of the channel through which molten glass may be discharged from the pool of molten glass 27 residing in the bottom portion of the furnace 11. The top of the delivery means 13 is defined by a roof 39. The roof is preferably a flat arch which is supported by supporting means (not shown). The supporting means extend above the roof and are connected to flat arch supporters 40 embedded in the flat arch itself. Extending transversely across the delivery means 13 are two gates or tweels. The first of these is a backup tweel 41 connected to a support assembly 43 (not fully shown) for raising or lowering it into engagement in the pool of molten glass 27. The second tweel is a control tweel 45 supported by support assembly 47 (not fully shown) for raising and lowering the tweel. The tweel is held in operating position in contact with the molten glass to be delivered for forming. The control tweel 45, along with the threshold 31 and the jambs 37, defines an opening through which a layer of molten glass 49 may be delivered for forming.

The forming chamber 15 comprises a bottom casing 51 supported on support 62 in addition to support 34. This casing is preferably a casing constructed of metal, such as steel. The casing is preferably impervious to the molten metal in the chamber. The forming chamber 15 further comprises a top casing 53 and an end casing 55. Both of these casing members are also preferably constructed of impervious metal. Disposed within the bottom casing 51 is a refractory bottom 57, preferably a refractory bottom that has been cast in place inside the bottom casing 51. Preferably embedded within the bottom refractory 57 are pipes 59 through which coolant or other fluid may be directed for controlling the temperature of the forming chamber 15 at discrete locations along its length. Also extending transversely across the forming chamber 15 are dams or weirs 61 mounted in the refractory bottom 57 and extending across its width. These dams are preferably adjustable and are held down at their ends at each side of the forming chamber. They are preferably constructed of material that is less dense than the molten metal in the forming chamber so that their vertical position may be varied upwardly or downwardly by controlled adjustment of holddown devices at their ends.

The forming chamber 15 further comprises refractory side walls 63 and a refractory exit lip 65. These, along with the bottom refractory 57 and the threshold 21, define a container in which a pool of molten metal 66, preferably molten tin or an alloy of tin, is disposed. At the downstream end of the forming chamber there are provided extensions 67 of the bottom container portion of the forming chamber which serve as cavities into which dross floating on the surface of the molten metal 66 may be withdrawn for removal from the forming chamber. The upper portion of the forming chamber includes an end wall liner 69, preferably constructed of refractory material. This liner 69 and the end casing 55 to which it is connected may include a suitable opening 70 through which a continuous sheet of glass may be withdrawn from the forming chamber along a substantially horizontal path in the event that such removal is temporarily desired.

The upper portion of the chamber further includes a lintel 71 at its upstream end. This lintel 71 may be used as a means for supporting delivery means roof 39. Additionally the upper portion of the chamber includes a ceiling or roof 73 preferably constructed of a refractory material suitable for radiating or absorbing heat uniformly over the area facing the glass beneath it during operation. Extending through the ceiling of the forming chamber are controllable heating elements 75 used to control the rate of heat removal from the glass during forming. These heating elements are connected to bus bars 77 which are connected, in turn, to a source of electric power (not shown). Similarly, heaters 76 are positioned along the sides of the chamber 15 and connected to a source of electrical power. These heaters 76 extend over the marginal edge portions of an advancing layer and sheet of glass and are spaced sufficiently close to it to limit their view of the glass to limited portions of the glass facing the heaters directly. These heaters 76 are used to preferentially retard the loss of heat from the marginal edge portions of the advancing glass and maintain the temperature of the glass more uniform across its width than would otherwise be maintained. The upper portion of the forming chamber 15, preferably includes a top casing end wall 79 providing a space between the upper portion of the forming chamber 15 and the upstream or furnace side of the conveyor mechanism 17.

Advancing along the surface of the pool of molten tin 66 is a continuous sheet of glass 81 formed from the layer of molten glass 49 delivered onto the pool of molten tin for forming. Extending into the forming chamber through its side walls there may be provided edge contacting devices 83 for applying outward tractive forces to the layer of glass 49 during its advance along the pool of molten metal for forming. These devices are preferably driven wheels disposed and driven in such manner as to apply opposing outward or transverse forces to the glass to maintain its width during its attenuation. The resultant forces resulting from the combination of longitudinal and transverse forces acting on the glass cause it to be attenuated to a thickness that is less than that which would be attained by molten glass if allowed to remain on the surface of the pool of molten metal for a sufficient time to come to equilibrium with it. The heaters 76 of the present invention are most needed when edge-contacting devices 83 are employed for, when they are used, the glass tends to cool excessively along the marginal edge portions contacted by the devices.

The vertical conveyor 17 comprises a machine casing 91 and thermally insulated machine wall 93. The machine walls 93 are preferably constructed of refractory material. Within the preferred vertical conveyor there is a series of supporting rolls 95 for engaging a continuous sheet of glass 81 and for conveying it upwardly through the conveyor. These machine rolls are operated in a coordinated manner. They are used to apply sufficient tractive forces to the glass to convey it upwardly and to transmit tractive forces along the glass downwardly and about the curved glass at liftoff to the hot or more fluid glass within the advancing layer of glass 49. There, the glass, which is hotter and more fluid, is susceptible to forming and attenuation due to the imposition of these tractive forces.

Disposed across the internal space within the conveyor casing at several locations along its length are machine seals 97 for retarding the flow of gases either upwardly or downwardly through the enclosed space surrounding the rolls 95. Extending through the walls of the enclosed conveyor are openings 99 through which broken glass or cullet may be directed in the event the continuous sheet of glass is chipped or broken in the upper portion of the conveyor. A space is provided between the top casing of the forming chamber and the walls of the vertical conveyor for accommodating cullet removal. This space is characterized as a cullet chamber 101.

In a preferred embodiment of this invention, coolers 103 are disposed across the bottom portion of the vertical conveyor to control the removal of heat from a continuous sheet of glass 81 as it is conveyed upwardly from the surface of the pool of molten metal of the forming chamber.

Figures 2, 3B:
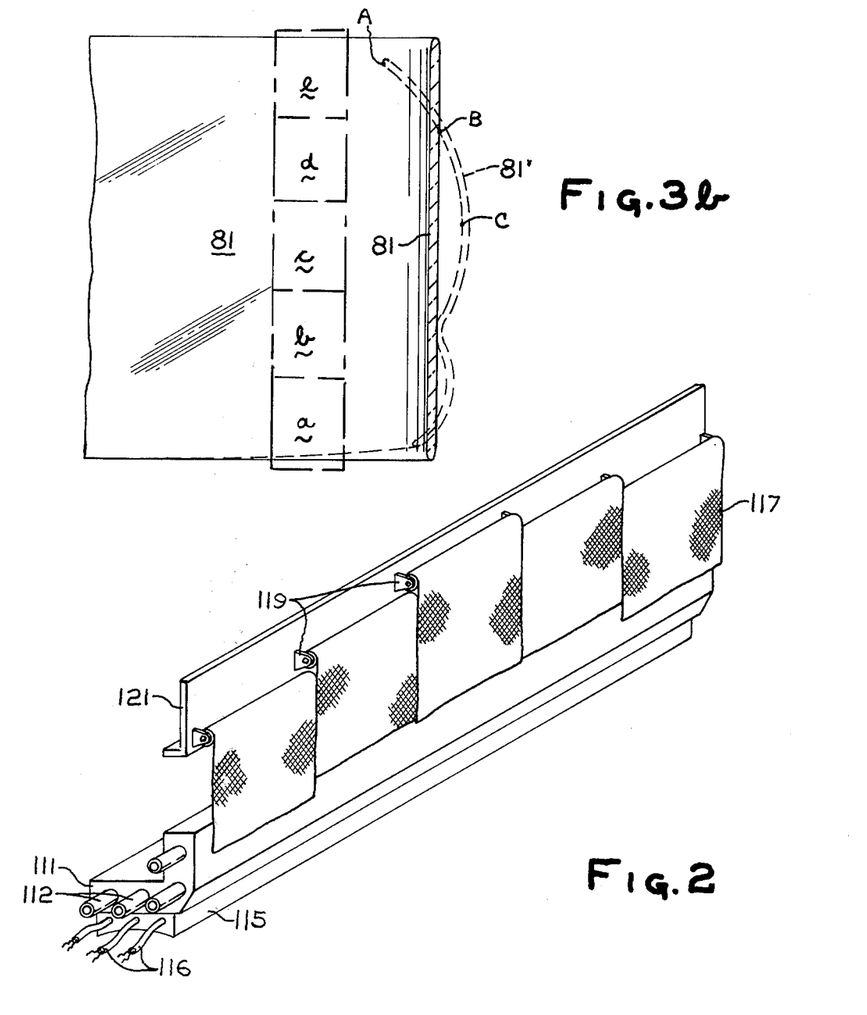
FIG. 2 is a perspective view of a suitable segmented heater/cooler for use in the apparatus shown in FIG. 1.
FIGS. 3A and 3B are partial sectional schematic views of the liftoff location in a forming chamber such as shown in FIG. 1 showing in detail the effect of selective heating and/or cooling upon the flatness of a continuous sheet of glass during and immediately after lifting from the surface of a supporting pool of molten metal.

Extending across the forming chamber upstream of the location at which a sheet of glass is lifted from the pool of molten metal is a segmented heater/cooler 111 to selectively adjust and maintain the temperature of the glass passing it. The heater/cooler 111 is effective for selectively adjusting and maintaining the temperature of the glass at a plurality of selected locations spaced across the width of the glass. The heater/cooler 111 comprises a main cooler body having faces for facing the advancing glass. Connected to the cooler body are conduits 112 for directing coolant, such as water, to and from the cooler. The upstream side of the cooler is preferably covered with thermal insulation 113 to prevent unnecessary cooling of the portion of the forming chamber where the glass must be kept hotter and more fluid for forming and attenuation.

Mounted on the face of the cooler body facing the advancing glass is a segmented heater 115 having electric supply cables 116 connected to it and to a controllable source of power (not shown). The heater 115 is comprised of several separately controllable sections, 15a through 15e for example. The individual heating elements may be resistance coils as shown or rigid resistance heating elements, such as silicon carbide rods or the like. Each separate section is individually controllable and preferably each heating element of each section is individually controllable. This permits fine, precise control of the glass temperature completely across the width of the glass sheet.

A series of radiation shields or curtains 117 are mounted above the cooler 111. These curtains 117 are mounted on adjustable mountings 119 connected to a support 121. Thermal insulation 123 is provided on the upstream face of the support 121, again to prevent unnecessary cooling of the main portion of the forming chamber. The curtains 117 may be individually adjusted to shield particular portions of the upwardly ascending glass from the downstream face of the cooler 111. This further assists in adjusting and maintaining a uniform temperature for the glass across its full width.

Figure 3A:
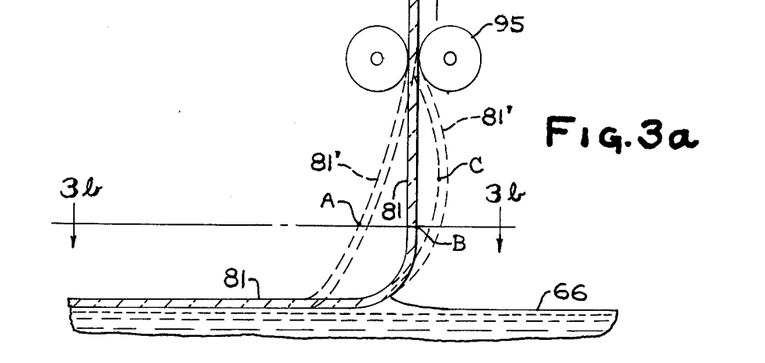
Figure 4:
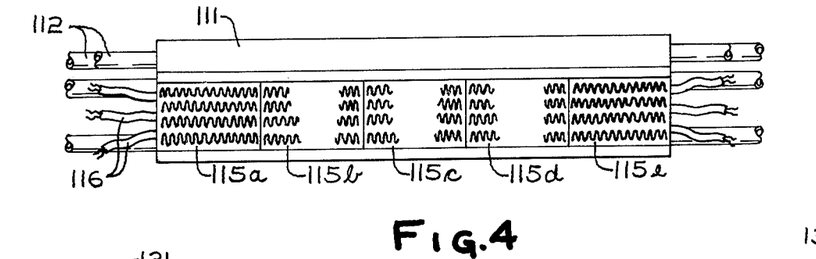
FIG. 4 shows a bottom view of the heater/cooler shown in FIG. 2.
Figure 5:
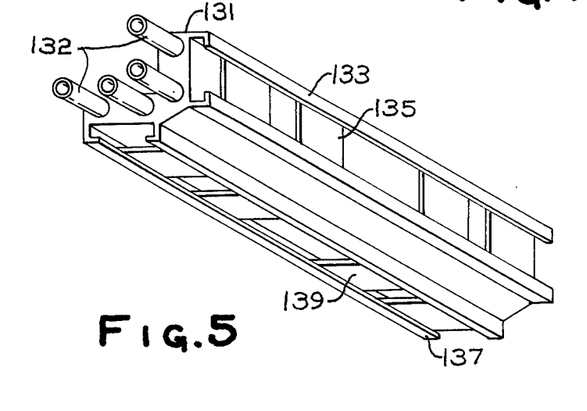
FIGS. 5, 6, 7 and 8 show an alternate embodiment of a cooler for use in the present invention in perspective, a partial sectional elevation view, front elevation and bottom plan view, respectively.
Figure 6:
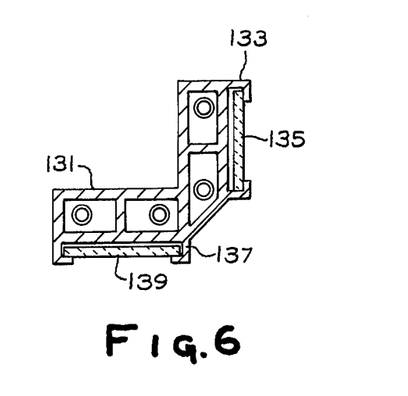
Figure 7:
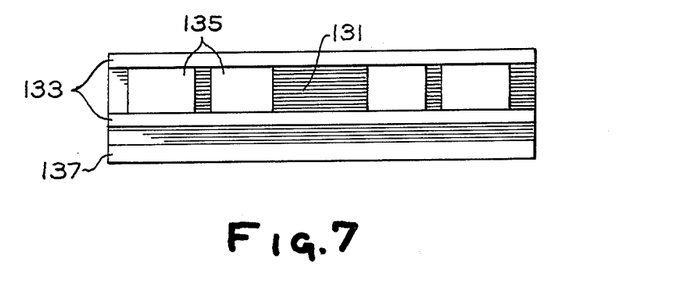
Figure 8:
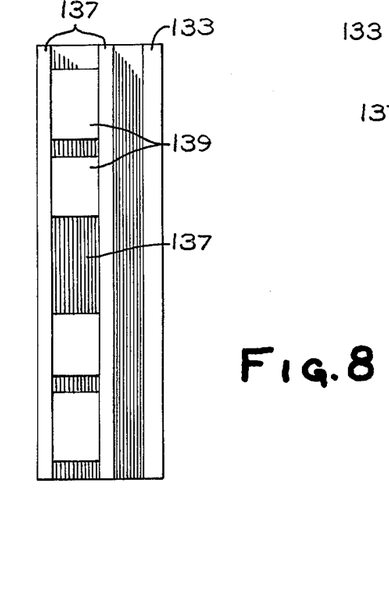

In FIGS. 3A and 3B there are shown schematic views of a continuous sheet of glass 81 being lifted upwardly from a supporting pool of molten metal 66. FIG. 3A shows a sectional elevation view of the glass sheet.

FIG. 3B shows a schematic sectional plan view of the continuous sheet of glass in the vicinity where it is lifted from the pool of molten metal with the view taken along section lines 3B–3B of FIG. 3A. Two continuous sheets of glass are represented in these drawings — one is shown by solid lines and represents a continuous sheet of glass 81 having its flatness properly controlled according to this invention, and one is shown by broken lines and indicates a continuous sheet of glass 81' that is not flat.

Referring first to the misaligned sheet 81' shown in the drawing by the broken lines, it is observed that while the sheet is advancing horizontally along the surface of the pool of metal 66 in the forming chamber, it appears to be advancing satisfactorily. However, as the glass is lifted, the radii of curvature of various portions of the continuous sheet of glass 81' vary widely and the glass has different lengths in these different portions of the sheet. As the sheet of glass enters the lowermost traction rolls 95 of a conveyor at an angle, the sheet is flattened and forced into conformity with the plane of the conveyor by the mechanical forces applied to it due to contact with the rolls 95. This also marks the surface of the glass. By applying the principles of this invention, the rate of cooling of several selected portions of the continuous sheet of glass is adjusted to be greater while the rate of cooling of other selected portions of the continuous sheet of glass is decreased until the continuous sheet of glass is smoothly lifted as a flat sheet from the pool of molten metal. The upwardly ascending portion of the continuous sheet of glass 81 below the first pair of engaging traction rolls 95 in the conveyor is kept flat and aligned with the plane of the conveyor as shown by the continuous sheet of glass represented by solid lines in FIGS. 3A and 3B.

Another embodiment of a suitable cooler for use in the practice of this invention is shown in FIGS. 5, 6, 7 and 8. A cooler 131 is provided in place of the heater/cooler 111 in a forming chamber. The cooler 131 has coolant conduits 132 connected to it for directing a coolant such as water through it. The cooler 131 has channels or other mounting elements 133 connected to it to support and hold thermal insulators 135 over the downstream face of the cooler 131. The cooler 131 further has channels or other mounting elements 137 connected to it to support and hold thermal insulators over the bottom face of the cooler 131. The size, number and position of the thermal insulators 135 and 139 may be varied to effect different cooling patterns for the glass advancing first past the bottom face of the cooler and then ascending past the downstream face of the cooler. This embodiment of the invention is simple, cheap and easily constructed but offers less flexibility than the preferred embodiment.

The function of the apparatus already described and the effect of the practice of this invention upon glass during its forming on, advance over and removal from a pool of molten metal may be further appreciated from a consideration of the following example. Consider FIGS. 1, 3A and 3B. A typical soda-lime-silca glass is produced in a forming chamber such as illustrated. Although heater/cooler 111 is present, it is not initially used. The bulged glass 81' is flattened by using the heater/cooler to selectively adjust and maintain the temperatures of five portions of the advancing glass prior to lifting the glass. View areas, a through e, of the segmented heaters, 115a through 115e, project onto the glass as illustrated. Electric power applied to sections 115b and 115e is increased relative to that applied to the other sections. More power is applied to section 115e than 115b. The power to section 115c is reduced or turned off for a short time. Meanwhile, the flow of water through the cooler 111 is increased to full flow. The sheet of glass quickly becomes flat and the line of glass lift off is straightened. The average temperature of the glass across the width of the sheet is 1230°F. (665°C.) with no portion having a temperature greater than 1240°F. (670°C.) or less than 1220°F. (660°C.). While not intending to be bound to any theoretical explanation of reasons for the success of this invention, the following matters are believed useful to an understanding of the invention.

A typical soda-lime-silica glass containing about 71 percent by weight silica may be considered to illustrate the effect of several factors upon the lengthening of glass during lifting which lengthening is undesired because of its effect upon the flatness of glass.

The viscosity of the glass is expressed as a function of temperature in the conventional manner.

$$\log \eta = -0.00883\,T + 19.5$$

where $\eta$ is the viscosity in poise and $T$ is temperature expressed in °F. (of course, the appropriate conversion factor for °C. = (°F. − 32) × 5/9 is applicable). From this and the accepted principles of differential calculus it is evident that the following relationship describes the dynamic effect of temperature upon viscosity.

$$\frac{d\eta}{dT} = -.00883\eta$$

From the principles of momentum transfer in viscous media, it is evident that the stress is a function of viscosity and the rate of change of velocity along the length of the glass with respect to location along that same length. Thus, $$\tau = 3\eta\,\frac{dv_y}{dy},$$

where $\tau$ is the stress, $v$ is the velocity with $v_y$ being the velocity in the $y$ direction and $y$ is a length along the direction of glass movement.

The rate of change of the length related velocity variation (which in itself is an elongation rate) with respect to temperature is then $$\frac{d}{dT}\left(\frac{dv_y}{dy}\right)_\tau = \frac{-.00883}{3}\,\frac{\tau}{\eta}$$

Solving this between 1350°F. (730°C.) and 1500°F. (815°C.) reveals that the rate of lengthening at the higher temperature is about 25 times as great as at the lower temperature. Although, theoretically lengthening could be permitted to occur while avoiding differential lengthening across an ascending sheet of glass, it is preferable to cool the glass to temperatures below 1350°F. (760°C.) prior to lifting. Even so, it is found desirable to control the temperature of the glass in selected portions across its width to insure a uniform transverse temperature in the sheet prior to lifting it.

The variation in velocity with respect to length is, of course, equivalent to the variation in length with respect to time divided by the length; this follows from the definition of velocity. Since gravity acting on the mass of the ascending glass beneath the first traction rolls provides the force for lengthening of the glass, the unit stress applied to the glass is the product of the glass density, the gravitational constant and the height above the molten metal for the glass under consideration. When considering lifting glass about 20 inches (50 centimeters) before engaging it with a traction roll, it is seen that the tendency to lengthen, that is, the increase in length over the distance, is more than an order of magnitude greater at 1500°F. (815°C.) than at 1350°F. (730°C.). The relative rates of lengthening at different temperatures, all close to 1500°F. (815°C.), vary much more than the relative rates of lengthening at different temperatures, all close to 1350°F. (730°C.).

With these observations in mind, the present invention is preferably practiced to provide sufficient cooling to cool the glass to below about 1350°F. (730°C.) while providing selective heating and/or cooling of the glass to maintain its temperature in each portion across its width within 20°F. and preferably 10°F. (5°–10°C.) of its temperature in any other portion. If the glass temperature were permitted to be generally higher, the variation in temperature would necessarily have to be less. By imposing upon the glass a generally lower temperature for lifting, it is relatively easy to use the simpler cooling device such as illustrated in FIGS. 5, 6, 7 and 8 to practice this invention. The cooling is sufficient to yield a glass viscosity of at least $10^{7.5}$ poises at liftoff.

Although this invention has been described with reference to particular embodiments of it and has been illustrated by specific examples, those skilled in the art of glass manufacture will recognize that departures may be made from these specific embodiments of the invention without departing from the invention itself.

We claim:

1. In the method of making flat glass wherein a layer of molten glass is delivered onto the surface of a pool of molten metal, the glass is advanced in a substantially horizontal path along the surface of the pool of molten metal, the glass is cooled during its advance to form a continuous sheet of glass and the continuous sheet of glass is lifted upwardly along a curved path from the pool of molten metal and then conveyed substantially vertically upwardly along a substantially vertical path away from the pool of molten metal; the improvement of adjusting and maintaining the temperature in each of a plurality of discrete portions of the sheet of glass to be within 20°F. (10°C.) of the temperature of each other discrete portion of the advancing glass, the discrete portion of the glass being disposed from one another transversely across the width of the continuous sheet of glass as it is lifted from the pool of molten metal along the curved path such that its curvature is substantially uniform across all of its width as the continuous sheet of glass is lifted from its horizontal path of advance to its vertical path of conveyance.

2. The method according to claim 1 wherein the temperature of each of the plurality of discrete portions of the sheet of glass is adjusted and maintained to be within 20°F. (5°C.) of each other discrete portion of the sheet of glass as the glass is lifted from the pool of molten metal.

3. The method according to claim 1 further comprising the step of heating marginal edge portions of the sheet of glass prior to carrying out the step of adjusting and maintaining the temperature of each discrete portion of the sheet of glass.

4. The method according to claim 1 wherein the step of adjusting and maintaining the temperature of each discrete portion of the sheet of glass is carried out by selectively applying heat in a space closely spaced from and facing the upper surface of the sheet of glass in a region where the glass is being lifted along a curved path from the pool of molten metal.

5. The method according to claim 1 wherein the step of adjusting and maintaining the temperature of each discrete portion of the sheet of sheet of glass is carried out by selectively removing heat from a space closely spaced from and facing discrete portions of the upper surface of the advancing glass in a region where the glass from which heat is removed is being lifted along its curved path.

6. The method according to claim 5 wherein the step of adjusting and maintaining the temperature of each discrete portion of the sheet of glass includes selectively applying heat in a space closely spaced from and facing discrete portions of the upper surface of the sheet of glass and spaced from the space from which heat is removed and within the region where the glass from which heat is removed in discrete portions and to which heat is applied in discrete portions is being lifted along its curved path.

7. The method according to claim 5 wherein the selective cooling is accomplished by selectively thermally insulating the face of a cooler disposed transversely across, spaced from and facing the glass being lifted along its curved path and then being conveyed substantially vertically upwardly from the pool of molten metal.

8. In an apparatus for making flat glass comprising a forming chamber having a bottom, sidewalls, a roof, an inlet end and an outlet end and containing a pool of molten metal, means for delivering a layer of molten glass onto the surface of the pool of molten metal at the inlet end of the forming chamber, means for advancing the glass substantially horizontally along the surface of the pool of molten metal in a path extending from the inlet end of the forming chamber toward the outlet end thereof, means for cooling the glass during its advance to form a continuous sheet of glass, means for lifting the continuous sheet of glass upwardly along a curved path from the pool of molten metal and for conveying it substantially vertically upwardly therefrom; the improvement of means for adjusting and maintaining the temperature in each of a plurality of discrete portions of the sheet of glass to be within 20°F. (10°C.) of the temperature of each other discrete portion of the advancing glass, the discrete portions of the glass being disposed from one another transversely across the width of the continuous sheet of glass as it is lifted from the pool of molten metal along the curved path for maintaining substantially uniform curvature across the width of the continuous sheet of glass as it is lifted from its horizontal path to its vertical path, said temperature adjusting and maintaining means being disposed at least partially across the width of the forming chamber between its sidewalls and being spaced above the pool of molten metal beneath the roof of the forming chamber at a location at least partially overlying that at which glass is first lifted from the pool of molten metal.

9. The apparatus according to claim 8 wherein said temperature adjusting and maintaining means comprises an elongated cooler extending across at least the central portion of the forming chamber between its sidewalls and having means for selectively cooling the space beneath each of a plurality of discrete regions and said cooler along its length.

10. The apparatus according to claim 9 wherein said selective cooling means comprises means for applying heat to at least one discrete region of said cooler.

11. The apparatus according to claim 10 wherein said cooler has mounted on its face for facing a sheet of glass a plurality of individually controllable electric heating elements.

12. The apparatus according to claim 9 wherein said selective cooling means comprises means for thermally insulating a selected region of said cooler face facing a sheet of glass.

13. The apparatus according to claim 12 wherein said cooler has mounted at its face for facing advancing glass a mounting for movably mounting thermal insulation thereon and providing for the movement of thermal insulation between selected regions of said cooler and the sheet of glass.

* * * * *

UNITED STATES PATENT OFFICE
CERTIFICATE OF CORRECTION

PATENT NO. : 3,940,256

DATED : February 24, 1976

INVENTOR(S) : Joseph A. Gulotta, Leonard A. Knavish and John E. Sensi

It is certified that error appears in the above-identified patent and that said Letters Patent are hereby corrected as shown below:

Column 9, line 52, "portion" should be --portions--.

Column 9, line 63, "20°F." should be --10°F.--.

Column 10, line 12, delete "sheet of" (second occurrence).

Column 11, line 7, "and" should be --of--.

Signed and Sealed this first Day of June 1976

[SEAL]

Attest:

RUTH C. MASON
*Attesting Officer*

C. MARSHALL DANN
*Commissioner of Patents and Trademarks*